US012706322B2

(12) United States Patent
Kim et al.

(10) Patent No.: US 12,706,322 B2
(45) Date of Patent: Aug. 11, 2026

(54) APPARATUS FOR SEALING BATTERY CASE AND SECONDARY BATTERY MANUFACTURED USING THE SAME

(71) Applicant: LG Energy Solution, Ltd., Seoul (KR)

(72) Inventors: Geun Hee Kim, Daejeon (KR); Se Young Oh, Daejeon (KR); Jeong Min Ha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 574 days.

(21) Appl. No.: 18/028,838

(22) PCT Filed: Oct. 12, 2021

(86) PCT No.: PCT/KR2021/014049
§ 371 (c)(1),
(2) Date: Mar. 28, 2023

(87) PCT Pub. No.: WO2022/080834
PCT Pub. Date: Apr. 21, 2022

(65) Prior Publication Data

US 2024/0030481 A1 Jan. 25, 2024

(30) Foreign Application Priority Data

Oct. 12, 2020 (KR) ........................ 10-2020-0131454
Oct. 8, 2021 (KR) ........................ 10-2021-0134480

(51) Int. Cl.
*H01M 10/04* (2006.01)
*H01M 50/105* (2021.01)
*H01M 50/198* (2021.01)

(52) U.S. Cl.
CPC ..... *H01M 10/0409* (2013.01); *H01M 50/105* (2021.01); *H01M 50/198* (2021.01)

(58) Field of Classification Search
CPC ......... H01M 10/0409; H01M 10/0404; H01M 10/04; H01M 50/105; H01M 50/198;
(Continued)

(56) References Cited

U.S. PATENT DOCUMENTS 9,620,755 B2 4/2017 Kim et al.
2006/0093905 A1* 5/2006 Kim ..................... B29C 66/112 429/175

(Continued)

FOREIGN PATENT DOCUMENTS

CN 102044692 A 5/2011
CN 111653691 A 9/2020

(Continued)

OTHER PUBLICATIONS

English Translation of KR 20140086907 A—Apparatus and method for sealing pouch case of secondary battery; LG Chemical Ltd; Jul. 8, 2014 (Year: 2014).*

(Continued)

*Primary Examiner* — Adam J Francis
(74) *Attorney, Agent, or Firm* — Lerner David LLP

(57) ABSTRACT

An apparatus for sealing a battery case includes: a sealing tool configured to seal a side of a pouch-type secondary battery, wherein the sealing tool includes: a body; and a sealing part formed at one side of the body and configured to directly press the side so as to seal the side, wherein the sealing part includes: a weak sealing part configured to seal an inner portion of the side and formed to be recessed inward; and a pattern part configured to seal an outer portion of the side and formed by regularly repeating a rib formed to protrude outward and a groove formed to be recessed inward.

17 Claims, 15 Drawing Sheets

(58) Field of Classification Search
CPC ............. H01M 50/178; H01M 50/183; H01M 50/557; B29C 66/1312; B29C 66/133; B29C 66/549; B29C 66/721; B29C 66/72321; B29C 66/7234; B29C 66/72341; B29C 66/73921; B29C 66/81413; B29C 66/81435; B29C 66/8322; B29C 65/02; B29L 2031/3468; B29L 2031/7146
See application file for complete search history.

(56) References Cited

U.S. PATENT DOCUMENTS

| | | | | |
|---|---|---|---|---|
| 2011/0091766 | A1 | 4/2011 | Kim | |
| 2011/0244315 | A1* | 10/2011 | Yoon | H01M 50/105 156/146 |
| 2012/0288746 | A1 | 11/2012 | Abe et al. | |
| 2014/0349167 | A1 | 11/2014 | Wakai et al. | |
| 2015/0000117 | A1 | 1/2015 | Cho et al. | |
| 2017/0012252 | A1 | 1/2017 | Yoo et al. | |
| 2018/0047950 | A1 | 2/2018 | Lim et al. | |
| 2018/0175337 | A1* | 6/2018 | Lee | H01M 50/186 |
| 2019/0207171 | A1* | 7/2019 | Choi | H01M 50/124 |
| 2021/0036271 | A1 | 2/2021 | Lee et al. | |

FOREIGN PATENT DOCUMENTS

| | | | | |
|---|---|---|---|---|
| JP | H10-84862 | A | 4/1998 | |
| JP | 2002-260603 | A | 9/2002 | |
| JP | 2006-093120 | A | 4/2006 | |
| JP | 4075534 | B2 | 4/2008 | |
| JP | 4171855 | B2 | 10/2008 | |
| JP | 2013157286 | A | 8/2013 | |
| JP | 2016-506049 | A | 2/2016 | |
| JP | 2018-526769 | A | 9/2018 | |
| JP | 6407297 | B2 | 10/2018 | |
| KR | 100571269 | B1 | 4/2006 | |
| KR | 20070091877 | A | 9/2007 | |
| KR | 101250901 | B1 | 4/2013 | |
| KR | 20130080071 | A | 7/2013 | |
| KR | 101296949 | B1 | 8/2013 | |
| KR | 20140029258 | A | 3/2014 | |
| KR | 20140086907 | A * | 7/2014 | H01M 10/0404 |
| KR | 101527124 | B1 | 6/2015 | |
| KR | 20160062883 | A | 6/2016 | |
| KR | 20160118931 | A | 10/2016 | |
| KR | 20170101650 | A | 9/2017 | |
| KR | 2018-0035181 | A | 4/2018 | |
| KR | 101940150 | B1 | 1/2019 | |
| KR | 20190104684 | A | 9/2019 | |
| KR | 102042018 | B1 | 11/2019 | |

OTHER PUBLICATIONS

EESR for Application No. 21880481.3 dated Mar. 13, 2024. 7 pgs.

International Search Report for PCT/KR2021/014049 mailed Jan. 25, 2022. 3 pgs.

Search Report dated May 28, 2026 from the Office Action for Chinese Application No. 202180066827.0 issued May 29, 2026. 3 pgs. (see p. 2-3, categorizing the cited references).

* cited by examiner

FIG.22

APPARATUS FOR SEALING BATTERY CASE AND SECONDARY BATTERY MANUFACTURED USING THE SAME

CROSS-REFERENCE TO RELATED APPLICATIONS

The present application is a national phase entry under 35 U.S.C. § 371 of the International Application No. PCT/KR2021/014049 filed on Oct. 12, 2021, which claims priority from Korean Patent Application Nos. 10-2020-0131454, filed on Oct. 12, 2020, and 10-2021-0134480, filed on Oct. 8, 2021, the disclosures of which are incorporated herein by reference in their entireties.

FIELD OF THE INVENTION

The present invention relates to an apparatus for sealing a battery case and a secondary battery manufactured using the same, and more particularly, to an apparatus for sealing a battery case, which reduces a size of a poly-ball and improves sealing force of a side, and a secondary battery manufactured using the same.

BACKGROUND OF THE INVENTION

In general, secondary batteries include nickel-cadmium batteries, nickel-hydrogen batteries, lithium ion batteries, and lithium ion polymer batteries. Such a secondary battery is being applied to be used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the secondary battery, first, electrode active material slurry is applied to a positive electrode collector and a negative electrode collector to manufacture a positive electrode and a negative electrode. Then, the electrodes are stacked on both sides of a separator to form an electrode assembly. Also, the electrode assembly is accommodated in a battery case, and then the battery case is sealed after an electrolyte is injected therein.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

A pouch, which is a case of the pouch type secondary battery, is manufactured by forming a cup part by performing press processing on a pouch film having flexibility. In addition, when the cup part is formed, an electrode assembly is accommodated in an accommodation space of the cup part, and then, a side of the cup part is sealed to manufacture a secondary battery.

In a process of sealing the side, an apparatus for sealing the battery case is used, and the apparatus for sealing the battery case includes a sealing tool. However, in the sealing tool according to the related art, a surface of a sealing part is formed to be flat as a whole. Thus, an area sealed at the side of the secondary battery has also a flat outer surface, and a sealant layer sealed inside the side has also a surface sealed in a flat state. As a result, the sealing force of the side is reduced to cause a problem in which the side is easily bent even when a pressure inside the secondary battery slightly increases.

If the pressure that presses the side increases by the sealing tool, a portion of the sealant layer is melted, and thus, a poly-ball protruding toward an accommodation space of a cup part is largely formed. If the size of the poly-ball is large, there is a problem in that the poly-ball are in contact with an electrode assembly accommodated in the cup part, and thus, the electrode assembly is contaminated by the poly-ball. Furthermore, as a thickness of the sealant layer on the side became thinner, there is also a problem in that insulation is defective.

PRIOR ART DOCUMENTS (Patent Document 1) Korean Patent Registration No. 1296949

BRIEF SUMMARY OF THE INVENTION

An object of the present invention is to provide an apparatus for sealing a battery case, which reduces a size of a poly-ball and improves sealing force of a side, and a secondary battery manufactured using the same.

The objects of the present invention are not limited to the aforementioned object, but other objects not described herein will be clearly understood by those skilled in the art from descriptions below.

An apparatus for sealing a battery case according to an embodiment of the present invention for achieving the above object includes: a sealing tool configured to seal a side of a pouch-type secondary battery, wherein the sealing tool includes: a body; and a sealing part formed at one side of the body and configured to directly press the side so as to seal the side, wherein the sealing part includes: a weak sealing part configured to seal an inner portion of the side and formed to be recessed inward; and a pattern part configured to seal an outer portion of the side and formed by regularly repeating a rib formed to protrude outward and a groove formed to be recessed inward.

In addition, the groove may include a longitudinal groove formed in a longitudinal direction of the pattern part.

In addition, the groove may include a width groove formed in a width direction of the pattern part.

In addition, the groove of the pattern part may be recessed deeper than the weak sealing part.

In addition, the weak sealing part may be recessed inward by a thickness of 10 μm to 20 μm.

In addition, in the pattern part, the groove may be recessed inward by a thickness of 40 μm to 60 μm.

In addition, the rib and the groove may have the same width.

In addition, the weak sealing part may have a rounded edge.

In addition, in the weak sealing part, the edge may be rounded at a curvature radius of 0.7 mm to 0.8 mm.

In addition, the pattern part may have a rounded edge.

In addition, in the pattern part, the edge may be rounded at a curvature radius of 0.2 mm to 0.3 mm.

In addition, the sealing tool may further include: a first sealing tool configured to press one surface of the side; and a second sealing tool that is in contact with the first sealing tool with the side therebetween to press the other surface of the side, wherein a first sealing part of the first sealing tool may include: a first weak sealing part configured to seal the inner portion of the side and formed to be recessed inward;

and a first pattern part configured to seal the outer portion of the side and formed by regularly repeating a first rib formed to protrude outward and a first groove formed to be recessed inward, and a second sealing part of the second sealing tool may include: a second weak sealing part configured to seal the inner portion of the side and formed to be recessed inward; and a second pattern part configured to seal the outer portion of the side and formed by regularly repeating a second rib formed to protrude outward and a second groove formed to be recessed inward.

In addition, in the first pattern part and the second pattern part, the first rib and the second groove may be in contact with each other with the side 134 therebetween, and the second rib and the first groove may be in contact with each other with the side therebetween.

In addition, in the sealing part, a groove, into which an electrode lead of the secondary battery is inserted, may be formed to be recessed inward.

A secondary battery according to an embodiment of the present invention for achieving the above object includes: an electrode assembly formed by alternately stacking electrodes and separators; and a battery case in which the electrode assembly is accommodated and sealed, wherein the battery case includes: a first case in which a cup part that is a space, in which the electrode assembly is accommodated, is formed; a second case configured to cover the first case from above; and a side extending to the outside of the cup part to have an area on which the first case and the second case are sealed to each other, wherein the side has an unevenness in a shape protruding from or recessed into an outer surface of the sealed area of the side.

In addition, the side may have an unevenness having a shape protruding from or recessed into an inner surface of the sealed area, wherein the unevenness formed on the inner surface may have the protruding or recessed shape opposite to that of the unevenness formed on the outer surface.

In addition, the unevenness may have a length in a longitudinal direction of the side.

In addition, the unevenness may have a plurality of protruding or recessed shapes, and the protruding or recessed shapes are formed at regular intervals.

In addition, the unevenness may be formed in at least one of a rectangular shape or a rhombus shape in a cross-section of the protruding or recessed shape.

Other particularities of the embodiments are included in the detailed description and drawings.

According to the embodiments of the present invention, there are at least the following effects.

The weak sealing part for sealing the inner portion of the side may be recessed inward, and even if the sealing tool presses the side so that the pressure increases, the pressure pressing the outer portion of the side may increase, and the pressure pressing the inner portion may not increase to reduce the size of the poly-ball.

In addition, the pattern part sealing the outer portion of the side may be formed by regularly repeating the rib formed to protrude outward and the groove formed to be recessed inward to increase in surface area of the sealed area of the side and length of the path along which the side is bent, thereby increasing in sealing force of the side.

The effects of the prevent invention are not limited by the aforementioned description, and thus, more varied effects are involved in this specification.

BRIEF DESCRIPTION OF THE DRAWINGS

FIG. 22 is a box plot illustrating results obtained by comparing the side 134 sealed using the sealing tool according to the related art, the side 134 sealed using the sealing tools 21 and 22 according to an embodiment of the present invention, and the side 134 sealed using the sealing tools 21*a* and 22*a* according to another embodiment of the present invention with each other.

Figure 1:
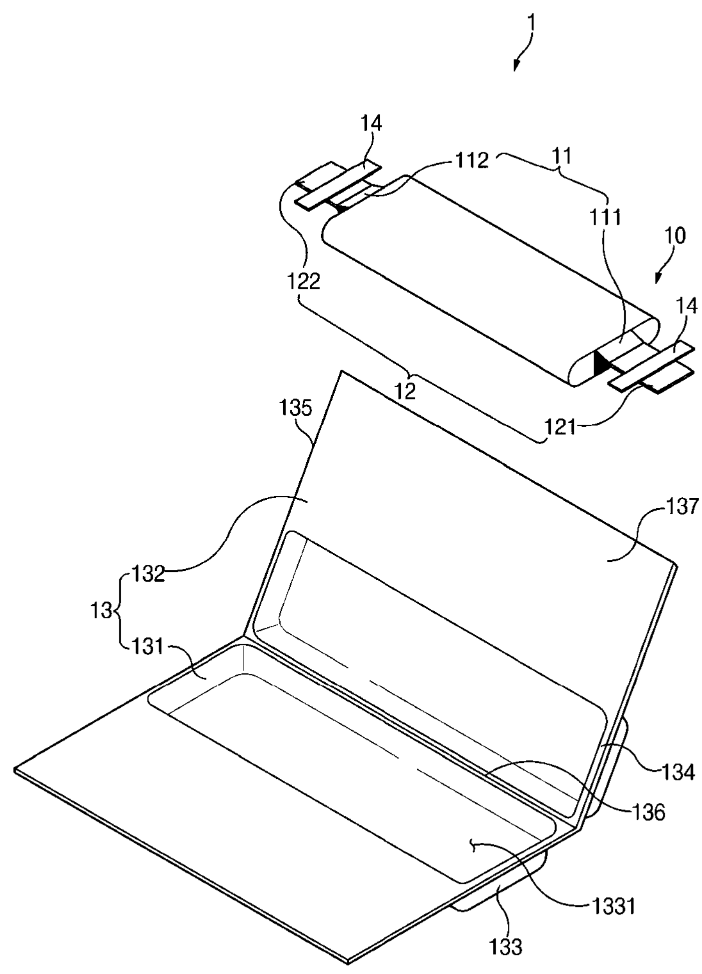
FIG. 1 is an assembled view of a secondary battery 1 according to an embodiment of the present invention.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "includes (includes)" and/or "including (including)" does not exclude other components besides a mentioned component.

Hereinafter, preferred embodiments will be described in detail with reference to the accompanying drawings.

FIG. 1 is an assembled view of a secondary battery 1 according to an embodiment of the present invention;

An electrode assembly 10 is formed by alternately stacking electrodes and separators. First, slurry in which an electrode active material, a binder, and a plasticizer are mixed with each other is applied to a positive electrode collector and a negative electrode collector to manufacture the electrodes such as a positive electrode and a negative electrode. Then, respective separators are stacked between the electrodes to form the electrode assembly 10, the electrode assembly 10 is inserted into the battery case 13, and an electrolyte is injected to seal the battery case 13.

Specifically, the electrode assembly 10 includes two types of electrodes, such as the positive electrode and the negative electrode, and the separator interposed between the electrodes to insulate the electrodes from each other. The electrode assembly 10 may be a stack type, a jelly roll type, a stacked and folding type, or the like. Each of the two types of electrodes, i.e., the positive electrode and the negative electrode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes electrode tabs 11. The electrode tabs 11 are respectively connected to a positive electrode and a negative electrode of the electrode assembly 10 to protrude outward from the electrode assembly 10, thereby providing a path, through which electrons are moved, between the inside and outside of the electrode assembly 10. An electrode collector of the electrode assembly 10 is constituted by a portion coated with an electrode active material and a distal end, on which the electrode active material is not applied, i.e., a non-coating part. Also, each of an electrode tabs 11 may be formed by cutting the non-coating part or by connecting a separate conductive member to the non-coating part through ultrasonic welding. As illustrated in FIG. 1, the electrode tabs 11 may protrude in each of different directions of the electrode assembly 10, but is not limited thereto. For example, the electrode tabs may protrude in various directions, for example, protrude in parallel to each other from one side in the same direction.

In the electrode assembly 10, an electrode lead 12 that supplies electricity to the outside of the secondary battery 1 is connected to the electrode tab 11 through spot welding. Also, a portion of the electrode lead 12 is surrounded by an insulating part 14. The insulating part 14 may be disposed to be limited to a side 134, at which a first case 131 and a second case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulating part 14 may be made of a nonconductor having non-conductivity, which is not electrically conductive. In general, although an insulation tape which is easily attached to the electrode lead 12 and has a relatively thin thickness is mainly used as the insulating part 14, the present invention is not limited thereto. For example, various members may be used as the insulating part 14 as long as the members are capable of insulating the electrode lead 12.

One end of the electrode lead 12 is connected to the electrode tab 11, and the other end of the electrode lead 12 protrudes to the outside of the battery case 13. That is, the electrode lead 12 includes a cathode lead 121 having one end connected to a cathode tab 111 to extend in a direction in which the cathode tab 111 protrudes and an anode lead 122 having one end connected to an anode tab 112 to extend in a direction in which the anode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material, which accommodates the electrode assembly 10 therein. Hereinafter, the case in which the battery case 13 is the pouch will be described. When a pouch film 135 having flexibility is drawing-molded by using a punch 22 or the like, a portion of the pouch film 135 is stretched to form a cup part 133 including a pocket-shaped accommodation space 1331, thereby manufacturing the battery case 13.

The battery case 13 accommodates the electrode assembly 10 so that a portion of the electrode lead 12 is exposed and then is sealed. As illustrated in FIG. 1, the battery case 13 includes the first case 131 and the second case 132. The accommodation space 1331 in which the cup part 133 is formed to accommodate the electrode assembly 10 may be provided in the second case 131, and the second case 132 may cover an upper side of the accommodation space 1331 so that the electrode assembly 10 is not separated to the outside of the battery case 13. As illustrated in FIG. 1, one side of the first case 131 and one side of the second case 132 may be connected to each other. However, the present invention is not limited thereto. For example, the first case 131 and the second case 132 may be separately manufactured to be separated from each other.

When the cup part 133 is molded in the pouch film 135, only one cup part 133 may be formed in one pouch film 135, but the present invention is not limited thereto. For example, two cup parts may be drawing-molded to be adjacent to each other in one pouch film 135. Then, as illustrated in FIG. 1, the cup parts 133 are formed in the first case 131 and the second case 132, respectively. Here, each of the cup parts 133, which are respectively formed in the first case 131 and the second case 132, may have the same depth D, but is not limited thereto, and may have different depths D. After accommodating the electrode assembly 10 in the accommodation space 1331 provided in the cup part 133 of the first case 131, the battery case 13 may be folded with respect to a bridge 136 formed between the two cup parts 133 in the battery case 13 so that the two cup parts 133 face each other. Then, the cup part 133 of the second case 132 also accommodates the electrode assembly 10 from the upper side thereof. Accordingly, since the two cup parts 133 accommodate one electrode assembly 10, the electrode assembly 10 having a thicker thickness may be accommodated when compared to a case in which one cup part 133 is provided. In addition, since the first case 131 and the second case 132 are integrally connected to each other by folding the battery case 13, the number of sides 134 to be sealed when a sealing process is performed later may be reduced. Thus, a process rate may be improved, and the number of sealing processes may be reduced.

The battery case 13 may include the cup part 133, in which the accommodation space 1331 accommodating the electrode assembly 10 is provided, and a degassing part 137 formed at a side portion of the cup part 133 to discharge a gas generated in the cup part 133 through a degassing hole H. When the electrode assembly 10 is accommodated in the cup part 133 of the battery case 13, and the electrolyte is injected, and then an activation process is performed, a gas is generated inside the battery case 13, and thus, a degassing process for discharging the gas to the outside is performed.

When the electrode lead 12 is connected to the electrode tab 11 of the electrode assembly 10, and the insulating part 14 is formed on a portion of the electrode lead 12, the electrode assembly 10 is accommodated in the accommodation space 1331 provided in the cup part 133 of the first case 131, and the second case 132 covers the accommodation space from the upper side. Also, the electrolyte is injected into the accommodation space, and the side 134 extending to the outside of the cup part 133 of each of the first case 131 and the second case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. Furthermore, the electrolyte may include a sulfide-based, oxide-based, or polymer-based solid electrolyte, and the solid electrolyte may have flexibility that is easily deformed by external force. The pouch type secondary battery 1 may be manufactured through the above-described method.

Figure 2:
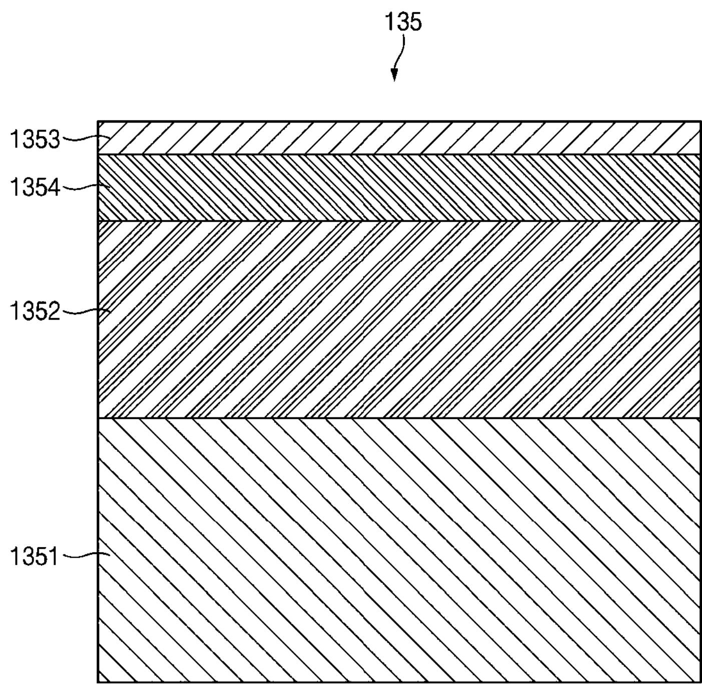
FIG. 2 is a cross-sectional view of a pouch film 135 according to an embodiment of the present invention.

FIG. 2 is a cross-sectional view of a pouch film 135 according to an embodiment of the present invention;

The pouch that is the battery case 13 of the pouch type secondary battery 1 according to an embodiment of the present invention may be manufactured by drawing the pouch film 135. That is, the pouch film 135 is drawn by using the punch 23 or the like to form the cup part 133, thereby manufacturing the battery case 13. According to an embodiment of the present invention, as illustrated in FIG. 2, the pouch film 135 includes a sealant layer 1351, a moisture barrier layer 1352, and a surface protection layer 1353.

The sealant layer 1351 may be made of the first polymer and be formed at the innermost layer to be in direct contact with the electrode assembly 10. Here, the innermost layer represents a layer disposed at the last when oriented in a direction opposite to the direction in which the electrode assembly 10 is disposed with respect to the moisture barrier layer 1352. The battery case 13 may be manufactured while a portion of the pouch film 135 is drawn to form the cup part 133 including the accommodation space 1331 having the pocket shape when the pouch film 135 having the stacked structure as described above is drawing-molded by using the punch 23 or the like. Also, when the electrode assembly 10 is accommodated in the accommodation space 1331, the electrolyte is injected. Thereafter, when the first case 131 and the second case 132 are in contact with each other so as to face each other, and thermal compression is applied to the side 134, the sealant layers 1351 are bonded to each other to seal the battery case 13. Here, since the sealant layer 1351 is in direct contact with the electrode assembly 10, the sealant layer 23 has to have insulating properties. Also, since the sealant layer 23 is in contact with the electrolyte, the sealant layer 23 has to have corrosion resistance. Also, since the inside of the battery case 13 is completely sealed to prevent materials from moving between the inside and outside of the battery case 13, high sealability has to be realized. That is, the side 134 in which the sealant layers 1351 are bonded to each other should have superior thermal bonding strength. In general, the first polymer forming the sealant layer 1351 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) is used for the sealant layer 23. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1351. Furthermore, the sealant layer 23 may be made of a casted polypropylene, an acid modified polypropylene, or a polypropylene-butylene-ethylene terpolymer. Here, the acid-treated polypropylene may be maleic anhydride polypropylene (MAH PP). Also, the sealant layer 1351 may have a single layer structure made of one material or a composite layer structure in which two or more materials are respectively formed as layers.

The moisture barrier layer 1352 is stacked between the surface protection layer 1353 and the sealant layer 1351 to secure mechanical strength of the pouch, block introduction and discharge of a gas or moisture outside the secondary battery 1, and prevent the electrolyte from leaking. The moisture barrier layer 1352 may be made of a metal, in particular, a metal including an aluminum alloy. Aluminum may secure the mechanical strength having a predetermined level or more, but be light in weight. Thus, aluminum may secure complement and heat dissipation for electrochemical properties due to the electrode assembly 10 and the electrolyte. The aluminum alloy may include a variety of materials. For example, one or more kinds of materials selected from the group consisting of iron (Fe), copper (Cu), chromium (Cr), manganese (Mn), nickel (Ni), magnesium (Mg), and zinc (Zn). Here, the moisture barrier layer 1352 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1353 is made of the second polymer and formed at the outermost layer to protect the secondary battery 1 against external friction and collision and also electrically insulates the electrode assembly 10 from the outside. Here, the outermost layer represents a layer disposed at the last when oriented in a direction opposite to the direction in which the electrode assembly 10 is disposed with respect to the moisture barrier layer 1352. The second polymer forming the surface protection layer 1353 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as polyethylene terephthalate (PET) having abrasion resistance and heat resistance may be used mainly. Also, the surface protection layer 1353 may have a single layer structure made of one material or a composite layer structure in which two or more materials are respectively formed as layers.

Although PET is inexpensive, has excellent durability, and has excellent electrical insulation, the PET has poor adhesiveness with respect to aluminum, which is frequently used for the moisture barrier layer 1352, and also, a behavior when the PET is stretched by applying stress is different. Thus, when the surface protection layer 1353 and the moisture barrier layer 1352 are directly bonded to each other, the protection layer 1353 and the moisture barrier layer 1352 may be delaminated during the draw-molding. As a result, the moisture barrier layer 1352 is not uniformly drawn to cause the deterioration in moldability.

According to an embodiment of the present invention, the battery case 13 may be made of a third polymer and further include the drawing assistance layer 1354 that is stacked between the surface protection layer 1353 and the moisture barrier layer 1352. The drawing assistance layer 1354 stacked between the surface protection layer 1352 and the moisture barrier layer 1352 to prevent the surface protection layer 1353 and the moisture barrier layer 1352 from being delaminated when the surface protection layer 1352 and the moisture barrier layer 1352 are drawn. The third polymer forming the drawing assistance layer 1354 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, since a nylon resin easily adheres to polyethylene terephthalate (PET) of the surface protection layer 1352, and a behavior when being stretched is similar to that of an aluminum alloy of the moisture barrier layer 1352, it is preferable that the nylon resin is mainly used. Also, the drawing assistance layer 1354 may have a single layer structure made of one material or a composite layer structure in which two or more materials are respectively formed as layers.

Figure 3:
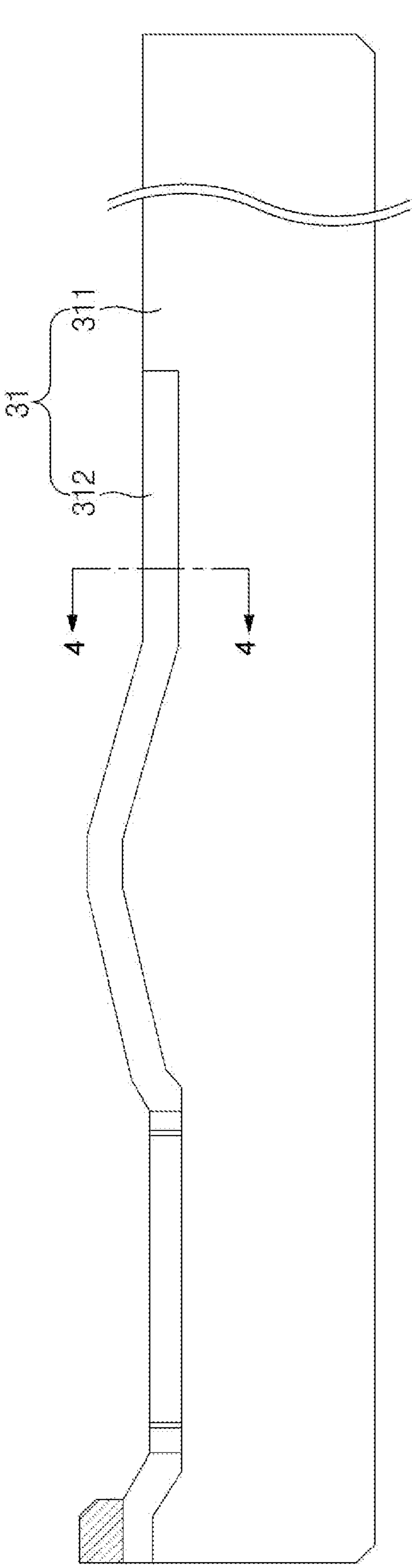
FIG. 3 is a schematic view illustrating a sealing tool 31 of an apparatus for sealing a battery case according to a related art.
Figure 4:
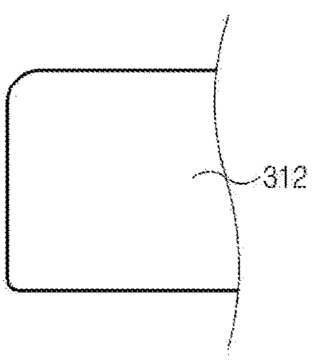
FIG. 4 is a cross-sectional view of a sealing part 312 of the sealing tool 31, taken along line 4-4 of FIG. 3, according to the related art.
Figure 5:
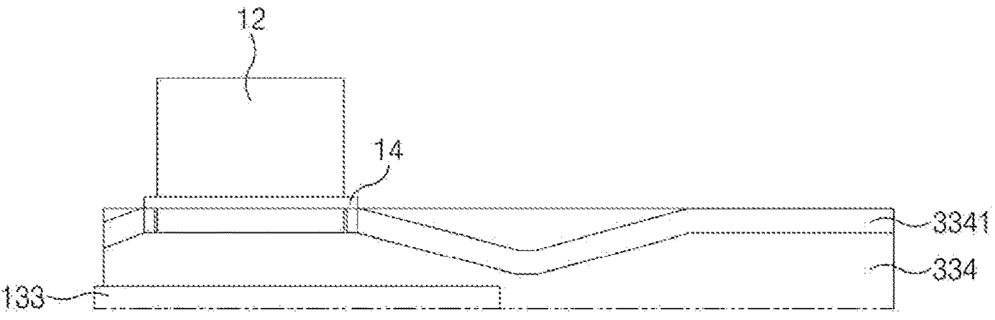
FIG. 5 is a partial enlarged view of a secondary battery, in which a side 334 is sealed using the sealing tool 31 according to the related art.

FIG. 3 is a schematic view illustrating a sealing tool 31 of an apparatus for sealing a battery case according to a related art, FIG. 4 is a cross-sectional view of a sealing part 312 of the sealing tool 31, taken along line 4-4 of FIG. 3, according to the related art, and FIG. 5 is a partial enlarged view of a secondary battery, in which a side 334 is sealed using the sealing tool 31 according to the related art.

The electrode assembly 10 is accommodated in the cup part 133 formed by drawing-molding the pouch film 135, and the battery case 13 is folded with respect to a bridge 136 so that the two cup parts 133 of the first case 131 and the second case 132 face each other. In addition, after sealing the side 134 and performing a degassing process through the degassing part 137, the degassing part 137 is cut. As a result, a length of the degassing part 137 may be shortened, and a volume of the secondary battery 1 may be reduced.

Here, in a process of sealing the side 334 (see FIG. 5), an apparatus for sealing a battery case may be used. The apparatus for sealing the battery case includes a sealing tool 31 that heats and presses a side 334 to seal the side 334 and a power transmission part (not shown) that moves the sealing tool 31 to a sealing position of the side 334 so that the sealing tool 31 applies a pressure to the side 334. In addition, the sealing tool 31 includes a body 311 and a sealing part 312 formed at one side of the body 211 and directly pressing the side 334 to seal the sealing part 312.

However, in the sealing tool 31 according to the related art, as illustrated in FIGS. 3 and 4, a surface of the sealing part 312 is formed to be flat as a whole. Thus, as illustrated in FIG. 5, an area 3341 sealed at the side 334 of the secondary battery also has a flat outer surface, and a sealant layer 1351 sealed inside the side 134 also has a surface sealed in a flat state. As a result, sealing force of the side 334 is reduced to cause a problem in which the side 334 is easily bent even when a pressure inside the secondary battery slightly increases.

Figure 6:
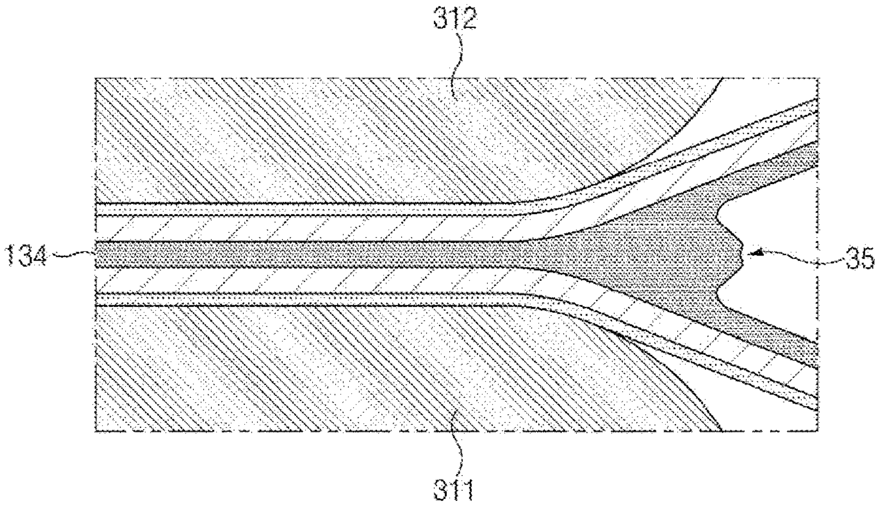
FIG. 6 is a schematic view illustrating a state in which the side 134 of the secondary battery 1 is sealed using the sealing tool 31 of the apparatus for sealing the battery case according to the related art.

FIG. 6 is a schematic view illustrating a state in which the side 134 of the secondary battery 1 is sealed using the sealing tool 31 of the apparatus for sealing the battery case according to the related art.

In order to solve the above problem, the pressure at which the sealing tool 31 presses the side 334 may increase. However, in this case, as illustrated in FIG. 6, a portion of a sealant layer 1351 is melted, and thus, a poly-ball 35 protruding toward the accommodation space 1331 of a cup part 133 is largely formed. If a size of the poly-ball 35 is large, the poly-ball 35 may be in contact with an electrode assembly 10 accommodated in the cup part 133, and thus, there is a problem in that the electrode assembly 10 is contaminated by the poly-ball 35. Furthermore, as a thickness of the sealant layer 1351 of the side 334 is reduced, there is also a problem in that insulation is defective.

Figure 7:
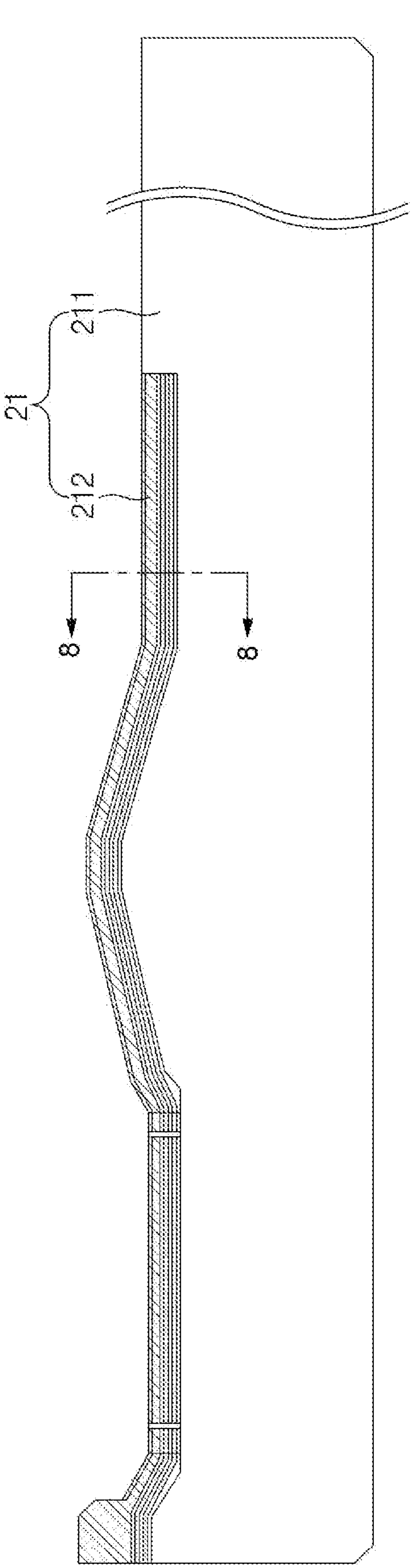
FIG. 7 is a schematic view illustrating a first sealing tool 21 of an apparatus for sealing a battery case according to an embodiment of the present invention.

FIG. 7 is a schematic view illustrating a first sealing tool 21 of an apparatus for sealing a battery case according to an embodiment of the present invention.

According to an embodiment of the present invention, weak sealing parts 2121 and 2221 (see FIG. 8) for sealing an inner portion of the side 134 are recessed inward, and thus, even though a pressure pressing the side 134 increases by the sealing tools 21 and 22, a pressure pressing an outer portion of the side 134 may significantly increase, and a pressure pressing an inner portion of the side 134 may not significantly increase to reduce a size of the poly-ball 15. In addition, pattern parts 2122 and 2222 sealing the outer portion of the side 134, ribs 2123 and 2223 formed to protrude outward, and grooves 2124 and 2224 formed to be recessed inward are formed to be regularly repeated, and thus, since a surface area of a sealed area 1341 of the side 134 and a length of a path along with the side 134 is bent increase, sealing force of the side 134 may increase.

For this, the apparatus for sealing the battery case according to an embodiment of the present invention includes the sealing tools 21 and 22 sealing the side 134 of the pouch-type secondary battery 1. Here, the sealing tools 21 and 22 include: bodies 211 and 221; and sealing parts 212 and 222 formed at sides of the bodies 211 and 212 and directly pressing the side 134 to seal the side 134, and the sealing parts 212 and 222 include: weak sealing parts sealing the inner portion of the side 134 and formed to be recessed inward; and pattern parts 2122 and 2222 sealing the outer portion of the side 134 and formed by regularly repeating the ribs 2123 and 2223 protruding outward and the grooves 2124 and 2224 recessed inward.

As described above, the sealing tools 21 and 22 include the bodies 211 and 221 and the sealing parts 212 and 222 formed at the side of the bodies 211 and 221 and directly pressing the side 134 to seal the sealing part 312. At this time, according to an embodiment of the present invention, the sealing parts 212 and 222 include the weak sealing parts 2121 and 2221 sealing the inner portion of the side 134 and the pattern parts 2122 and 2222 sealing the outer portion of the side 134. Here, the inner portion of the side 134 means an area that is relatively inner than the outer portion, and the outer portion of the side 134 means an area that is relatively outer than the inner portion.

Figure 8:
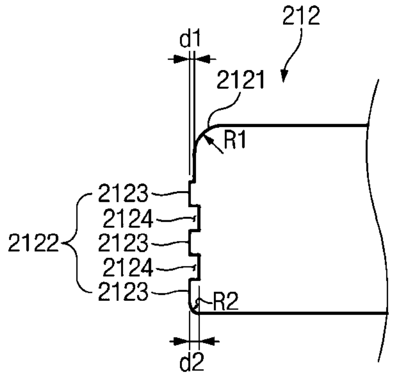
FIG. 8 is a cross-sectional view illustrating a first sealing part 212 of the first sealing tool 21, taken along line 8-8 of FIG. 7, according to an embodiment of the present invention.
Figure 9:
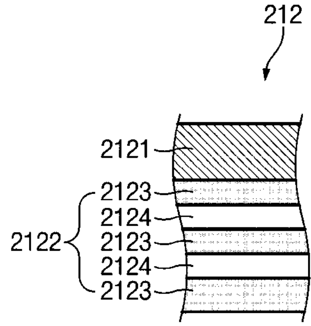
FIG. 9 is a partial enlarged view of the first sealing part 212 according to an embodiment of the present invention.

FIG. 8 is a cross-sectional view illustrating a first sealing part 212 of the first sealing tool 21, taken along line 8-8 of FIG. 7, according to an embodiment of the present invention, and FIG. 9 is a partial enlarged view of the first sealing part 212 according to an embodiment of the present invention.

Figure 14:
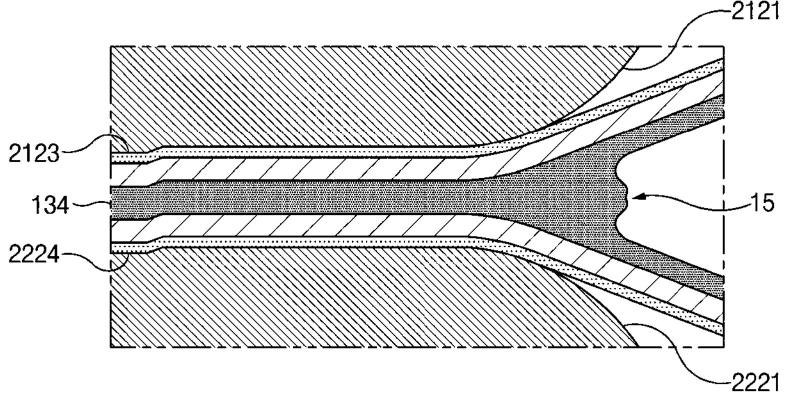
FIG. 14 is a schematic view illustrating a state in which the side 134 of the secondary battery 1 is sealed using the apparatus for sealing the battery case according to embodiments of the present invention.

As illustrated in FIG. 14, the weak sealing parts 2121 and 2221 seal the inner portion of the side 134 and are formed to be recessed inward. Thus, even though the pressure pressing the side 134 increases by the sealing tools 21 and 22, the pressure pressing the outer portion of the side 134 may significantly increase, and the pressure pressing the inner portion of the side 134 may not significantly increase to reduce the size of the poly-ball 15. Each of the weak sealing parts 2121 and 2221 may be recessed inward by a thickness d1 of 10 μm to 20 μm, preferably 12 μm to 18 μm. If the recessed thickness is less than 10 μm, there is a problem in that the size of the poly-ball 15 is not reduced because the pressure pressing the inner portion of the side 134 is still large. On the other hand, if the recessed thickness is greater than 20 μm, there is a problem in that the inner portion of the side 134 is not sufficiently pressed to deteriorate the sealing force.

As illustrated in FIG. 14, the weak sealing parts 2121 and 2221 may be rounded at a curvature radius R1 of 0.7 mm to 0.8 mm. Thus, an area between the sealed area 1341 and the unsealed area of the side 134 may not be bent, but be continuously changed in inclination. As a result, when a pressure inside the secondary battery 1 increases, and thus, a volume of the cup part 133 increases, an angle between the unsealed areas of the side 134 may relatively decrease, force for bending the side 134 may significantly decrease, and the sealing force may increase.

The pattern parts 2122 and 2222 seal the outer portion of the side 134 and are formed by regularly repeating the ribs 2123 and 2223 protruding outward and the grooves 2124 and 2224 recessed inward. Here, the ribs 2123 and 2223 formed to protrude outward may mean that the ribs 2123 and 2223 protrude toward the side 134 rather than the weak sealing parts 2121 and 2221. In addition, the grooves 2124 and 2224 formed to be recessed inward may mean that, when a plurality of ribs 2123 and 2223 protruding outward are formed, grooves 2124 and 2224 are formed in a recessed form between the plurality of ribs 2123 and 2223. Particularly, as illustrated in FIG. 9, the grooves 2124 and 2224 may include longitudinal grooves 2124 and 2224 formed along a longitudinal direction of the pattern parts 2122 and 2222. Thus, the sealing may be performed in a state in which an unevenness may be formed in a longitudinal direction of the side 134 on the side 134, in particular, an outer surface of the sealed area 1341 of the side 134, and an unevenness is formed also on the sealant layer 1351 sealed inside the side 134. Particularly, since the grooves include the longitudinal grooves 2124 and 2224, a formed direction of the unevenness may be perpendicular to a bent direction of the side 134. Thus, since the surface area of the sealed area 1341 of the side 134 and the length of the path through which the side 134 is bent increase, the sealing force of the side 134 may increase.

Also, the ribs 2123 and 2223 and the grooves 2124 and 2224 may have the same width. As a result, all the unevenness formed on the outer surface of the side 134 and the unevenness of the sealant layer 1351 may be formed at regular intervals to more effectively increase in length of the path through which the side 134 is bent.

Figure 10:
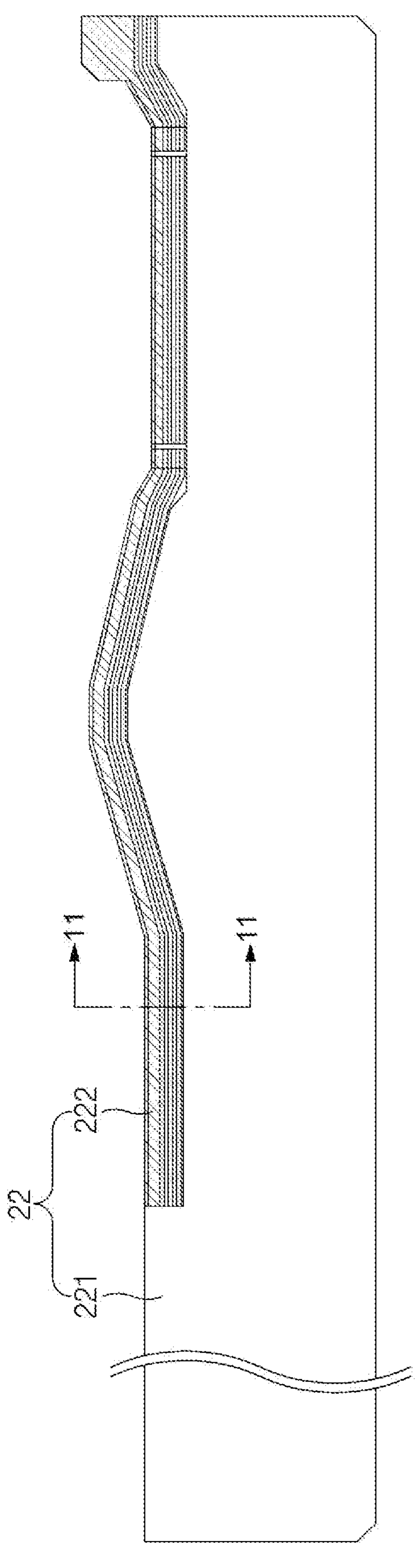
FIG. 10 is a schematic view illustrating a second sealing tool 22 of the apparatus for sealing the battery case according to an embodiment of the present invention.

FIG. 10 is a schematic view illustrating a second sealing tool 22 of the apparatus for sealing the battery case according to an embodiment of the present invention.

The apparatus for sealing the battery case may include only one sealing tool, and after the side 134 is seated on a specific die, one surface of the side 134 may be heated and pressed using the sealing tool. However, the apparatus for sealing the battery case may include two sealing tools 21 and 22 to heat and press both side surfaces of the side 134.

For this, the sealing tool according to an embodiment of the present invention may further include a first sealing tool 21 pressing one surface of the side 134; and a second sealing tool 22 that is in contact with the first sealing tool 21 with the side 134 therebetween to press the other surface of the side 134. Here, a first sealing part 212 of the first sealing tool 21 may include a first weak sealing part 2121 sealing the inner portion of the side 134 and formed to be recessed inward; and a first pattern part 2122 sealing the outer portion of the side 134 and formed by regularly repeating a first rib 2123 formed to protrude outward and a first groove 2124 formed to be recessed inward, and a second sealing part 222 of the second sealing tool 22 may include a second weak sealing part 2221 sealing the inner portion of the side 134 and formed to be recessed inward; and a second pattern part 2222 sealing the outer portion of the side 134 and formed by regularly repeating a second rib 2223 formed to protrude outward and a second groove 2224 formed to be recessed inward.

Figure 11:
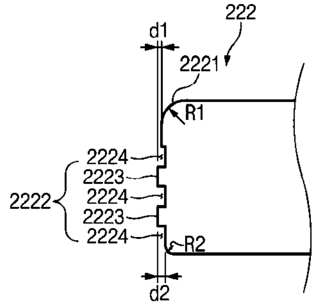
FIG. 11 is a cross-sectional view illustrating a second sealing part 222 of the second sealing tool 22, taken along line 11-11 of FIG. 10, according to an embodiment of the present invention.
Figure 12:
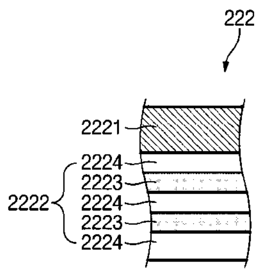
FIG. 12 is a partial enlarged view of the second sealing part 222 according to an embodiment of the present invention.

FIG. 11 is a cross-sectional view illustrating the second sealing part 222 of the second sealing tool 22, taken along line 11-11 of FIG. 10, according to an embodiment of the present invention. FIG. 12 is a partial enlarged view of the second sealing part 222 according to an embodiment of the present invention.

When the sealing tool includes the first sealing tool 21 and the second sealing tool 22, the first sealing tool 21 presses one surface of the side 134, and the second sealing tool 22 is in contact with the first sealing tool 21 with the side 134 therebetween to press the other surface of the side 134. That is, since the first sealing tool 21 and the second sealing tool 22 respectively press both surfaces of the side 134, the side 134 may be more effectively sealed.

The first sealing part 212 of the first sealing tool 21 includes the first weak sealing part 2121 sealing the inner portion of the side 134 and formed to be recessed inward and the first pattern part 2122 sealing the outer portion of the side 134 and formed by regularly repeating the first rib 2123 formed to protrude outward and the first groove 2124 formed to be recessed inward. Also, the second sealing part 222 of the second sealing tool 22 may include the second weak sealing part 2221 sealing the inner portion of the side 134 and formed to be recessed inward and the second pattern part 2222 sealing the outer portion of the side 134 and formed by regularly repeating the second rib 2223 formed to protrude outward and the second groove 2224 formed to be recessed inward.

Hereinafter, contents overlapping the above-described contents will be omitted. However, this is for convenience of explanation and is not intended to limit the scope of rights.

In the first pattern part 2122 and the second pattern part 2222, the first rib 2123 and the second groove 2224 may be in contact with each other with the side 134 therebetween, and the second rib 2223 and the first groove 2124 may be in contact with each other with the side 134 therebetween. That is, a sequence, in which the first rib 2123 and the first groove 2124 of the first pattern part 2122 are repeatedly formed, and a sequence in which, the second rib 2223 and the second groove 2224 of the second pattern part 2222 are repeatedly formed, may be opposite to each other. Thus, a cross section of the side 134 may form a wave pattern due to the unevenness formed on the side 134 to more increase in length of the path along which the side 134 is bent.

Also, the grooves 2124 and 2224 may not press the side 134 at all, while the ribs 2123 and 2223 may press the side 134 strongly. Thus, all of the sealed areas 1341 of the side 134 are completely sealed by the ribs 2123 and 2223, and the unevenness may be formed more clearly on the side 134 by the grooves 2124 and 2224.

The pressure pressing the side 134 by the weak sealing parts 2121 and 2221 only do not significantly increase. That is, the pressure pressing the side 134 increases to some extent, but the grooves 2124 and 2224 of the pattern parts 2122 and 2222 do not press the side 134 at all. Thus, the grooves 2124 and 2224 of the pattern parts 2122 and 2222 may be recessed deeper than the weak sealing parts 2121 and 2221. That is, each of the grooves 2124 and 2224 of the pattern parts 2122 and 2222 may be recessed by a thickness d2 of 40 μm to 60 μm, preferably 45 μm to 55 μm. If each of the grooves 2124 and 2224 are recessed inward by less than 40 μm, the grooves 2124 and 2224 may press the side 134 to some extent, and thus, the unevenness may not be clearly formed.

Each of the pattern parts 2122 and 2222 may have an edge rounded at a curvature radius R2 of 0.2 mm to 0.3 mm. Thus, an area between the sealed area 1341 and the unsealed area of the side 134 may not be bent, but be continuously changed in inclination.

Figure 13:
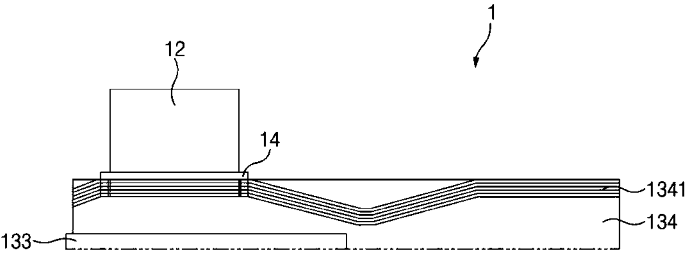
FIG. 13 is a partial enlarged view of the secondary battery 1, in which a side 134 is sealed using the sealing tool, according to an embodiment of the present invention.

FIG. 13 is a partial enlarged view of the secondary battery 1, in which the side 134 is sealed using the sealing tool, according to an embodiment of the present invention, and FIG. 14 is a schematic view illustrating a state in which the side 134 of the secondary battery 1 is sealed using the apparatus for sealing the battery case according to embodiments of the present invention.

According to an embodiment of the present invention, the sealing parts 212 and 222 include the pattern parts 2122 and 2222, and the ribs 2123 and 2223 and the grooves 2124 and 2224 of the pattern parts 2122 and 2222 are repeatedly formed with respect to each other. Thus, as illustrated in FIG. 13, the sealing may be performed in a state in which, an unevenness may be formed on an outer surface of the sealed area 1341 of the side 134 of the secondary battery 1, and an unevenness is formed also on the sealant layer 1351 sealed inside the side 134. Thus, since the surface area of the sealed area 1341 of the side 134 and the length of the path through which the side 134 is bent increase, the sealing force of the side 134 may increase.

In addition, since the sealing parts 212 and 222 also include the weak sealing parts 2121 and 2221, even if the pattern parts 2122 and 2222 increase the pressure pressing the side 134 to some extent, as illustrated in FIG. 14, the size of the poly-ball 15 may be reduced. Thus, the poly-ball 15 may be prevented from being in contact with the electrode assembly 10 accommodated in the cup part 133 to prevent the electrode assembly 10 from being contaminated by the poly-ball 15. Furthermore, since the thickness of the sealant layer 1351 of the side 134 does not decrease, a problem of insulation failure may also be prevented from occurring.

Figure 15:
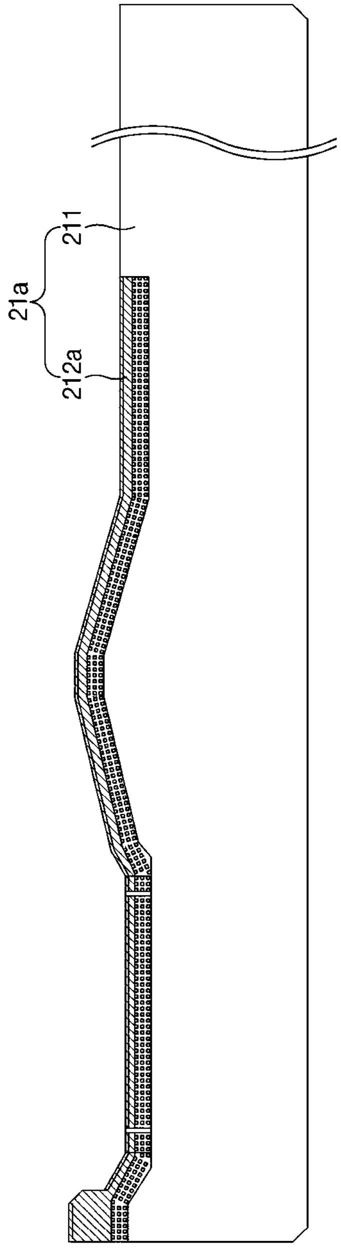
FIG. 15 is a schematic view illustrating a first sealing tool 21*a* of an apparatus for sealing a battery case according to another embodiment of the present invention.
Figure 16:
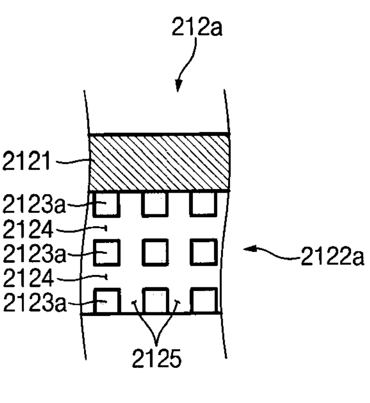
FIG. 16 is a partial enlarged view of a first sealing part 212*a* according to another embodiment of the present invention.
Figure 17:
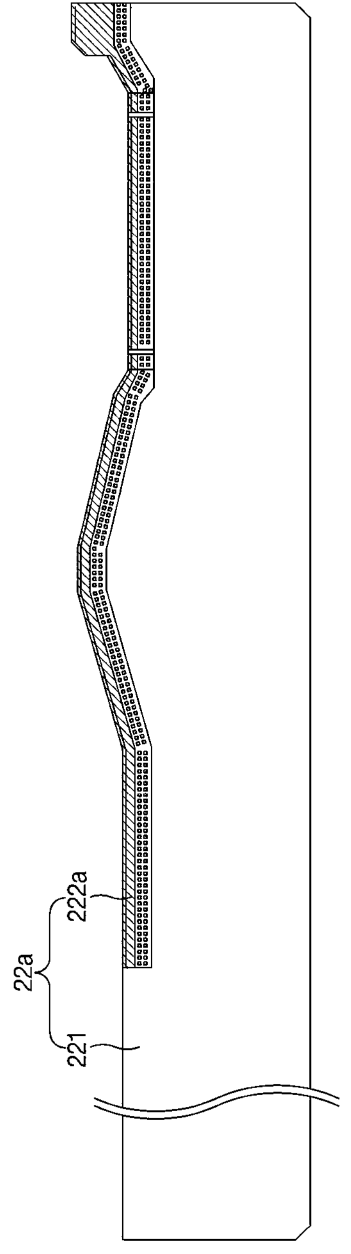
FIG. 17 is a schematic view illustrating a second sealing tool 22*a* of the apparatus for sealing the battery case according to another embodiment of the present invention.
Figure 18:
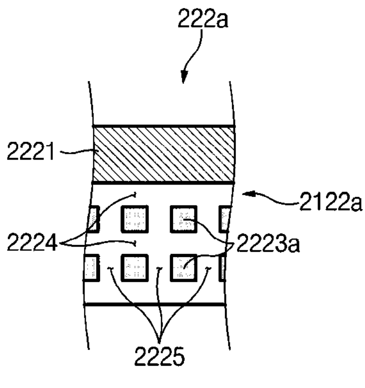
FIG. 18 is a partial enlarged view of a second sealing part 222*a* according to another embodiment of the present invention.

FIG. 15 is a schematic view illustrating a first sealing tool **21*a* of an apparatus for sealing a battery case according to another embodiment of the present invention, FIG. 16 is a partial enlarged view of a first sealing part 212*a* according to another embodiment of the present invention, FIG. 17 is a schematic view illustrating a second sealing tool 22*a* of the apparatus for sealing the battery case according to another embodiment of the present invention, and FIG. 18 is a partial enlarged view of a second sealing part 222*a*** according to another embodiment of the present invention.

According to an embodiment of the present invention, the groove includes only the longitudinal grooves 2124 and 2224 formed along the longitudinal direction of the pattern parts 2122 and 2222. On the other hand, according to another embodiment of the present invention, as illustrated in FIGS. 15 to 18, a groove may further include width grooves 2125 and 2225 formed along a width direction of pattern parts **2122*a* and 2222*a***. That is, two types of grooves may be formed to cross each other.

According to another embodiment of the present invention, in a first pattern part **2122*a* and a second pattern part 2222*a*, intersection areas of a first rib 2123*a*, a second longitudinal groove 2224, and a second width groove 2225 may be in contact with each other with a side 134 therebetween, and intersection areas of a second rib 2223*a*, a first longitudinal groove 2124, and a first width groove 2125 may be in contact with each other with the side 134** therebetween.

Figure 19:
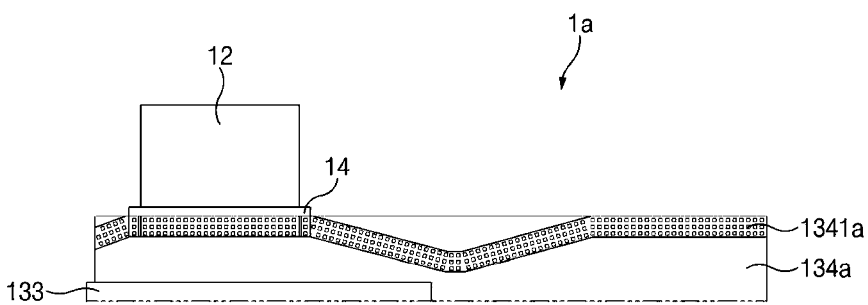
FIG. 19 is a partial enlarged view of a secondary battery 1, in which a side 134 is sealed using the sealing tools 21*a* and 22*a*, according to another embodiment of the present invention.

FIG. 19 is a partial enlarged view of a secondary battery 1, in which the side 134 is sealed using the sealing tools **21*a* and 22*a***, according to another embodiment of the present invention.

According to another embodiment of the present invention, as illustrated in FIG. 19, the sealant layer 1351 may be sealed in a state in which an unevenness formed on an outer surface of the side **134*a*, particularly a sealed area 1341 of the side 134***a* has a rectangular shape, and an unevenness formed on a sealant layer 1351 sealed inside the side 134*a* also has a rectangular shape.

Furthermore, although not shown in the drawings, according to a modified example of another embodiment of the present invention, two types of grooves may be formed to have an inclination in both the longitudinal direction and the width direction of the pattern parts 2121*a* and 2122*a*. That is, the unevenness formed on the outer surface of the sealed area 1341 of the side 134 may have a rhombus shape. As a result, a path along which the side 134 is bent may be longer, and since nodes are formed for each path, the side 134 may be bent in stages to further increase in sealing force.

Figure 20:
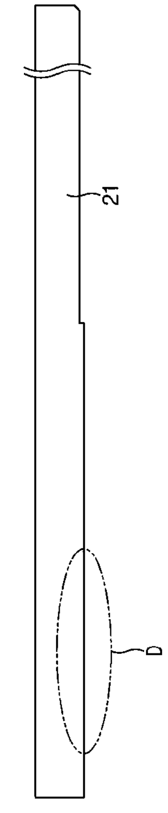
FIG. 20 is a side view of a sealing tool 21 according to embodiments of the present invention.
Figure 21:
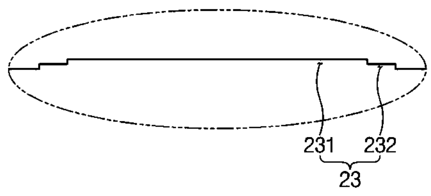
FIG. 21 is an enlarged view illustrating a portion D of FIG. 20.

FIG. 20 is a side view of a sealing tool 21 according to embodiments of the present invention, and FIG. 21 is an enlarged view illustrating a portion D of FIG. 20.

According to embodiments of the present invention, as illustrated in FIGS. 20 and 21, a groove 23 into which an electrode lead 12 of the secondary battery 1 is inserted may be formed to be recessed inward in sealing parts 212 and 222 of sealing tools 21 and 22. As described above, a portion of the electrode lead 12 is surrounded by an insulating part 14. In addition, the insulating part 14 is disposed to be limited to the side 134 to allow the electrode lead 12 to adhere to a battery case 13. Thus, when a first case 131 and a second case 132 are sealed to each other through the side 134, the electrode lead 12 is disposed on a partial area of the side 13, which protrudes outward.

As described above, since the partial area protruding outward by the electrode lead 12 forms a stepped portion on the side 134, the groove 23 may be formed in each of the sealing parts 212 and 222 so that the electrode lead 12 is inserted into the groove 23.

As illustrated in FIG. 21, the groove 23 may have a height difference and may be recessed inside the sealing parts 212 and 222. The insulating part 14 may surround the electrode lead 12, and the remaining portion may extend to both sides of the electrode lead 12. Then, the portion at which the insulating part 14 extends has a relatively thin thickness, and the portion at which the insulating part 14 surrounds the electrode lead 12 has a relatively thick thickness.

Thus, since the groove 23 has the stepped portion, only the insulating part 14 may be inserted into the relatively shallow peripheral portion 232, and the insulating part 14 and the electrode lead 12 may be inserted together into the relatively deep central portion 231.

Hereinafter, a secondary battery manufactured using the apparatus for sealing the battery case according to the above-described embodiment will be described with reference to FIGS. 1 and 7 to 19. A secondary battery manufactured by using the apparatus for sealing the battery case of the present invention includes an electrode assembly 10 formed by alternately stacking electrodes and separators and a battery case 13 in which the electrode assembly 10 is accommodated and sealed. The battery case 13 includes a first case 131 in which a cup part 133 that is a space, in which the electrode assembly 10 is accommodated, is formed, a second case 132 that covers the first case 131 from above, and a side 134 extending to the outside of the cup part 133 to have an area 1341 on which the first case 131 and the second case 132 are sealed to each other, and the side 134 has an unevenness in a shape protruding from or recessed into an outer surface of the sealed area 1341 of the side 134. Here, the unevenness having the shape protruding or recessed, which is formed on the side 134, may be formed by pattern parts 2122 and 2222, which are formed by regularly repeating ribs 2123 and 2223 formed to protrude outward and grooves 2124 and 2224 formed to be recessed inward in the above-described apparatus for sealing the battery case. Thus, the unevenness formed on the side 134 in the protruding or recessed shape may be formed to have a shape (form and width) corresponding to a shape (form and width) of each of the ribs 2123 and 2223 and the grooves 2124 and 2224. In more detail, the protruding shape formed on an outer surface of the side 134 is formed by the recessed grooves 2124 and 2224 in the apparatus for sealing the battery case, and the recessed shape formed the outer surface of the side 134 may be formed by each of the protruding ribs 2123 and 2223 in the apparatus for sealing the battery case.

As described above, in the secondary battery according to the present invention, since a surface area of the sealed area 1341 of the side 134 and a length of a path through which the side 134 is bent increase, sealing force of the side 134*a* may increase.

In addition, an unevenness having the shape protruding from or recessed into an inner surface may be formed. The protruding or recessed shape of the unevenness formed in the inner surface may be opposite to that of the unevenness formed in the outer surface. That is, when the pattern parts 2122 and 2222 press the outer surface of the side 134, the pressed side 134 may be formed to have a shape opposite to that of the unevenness of the outer surface when viewed from the inner surface.

In addition, the unevenness may be formed to have a length along a longitudinal direction of the side 134. Particularly, as illustrated in FIG. 9, the grooves 2124 and 2224 of the apparatus for sealing the battery case may include longitudinal grooves 2124 and 2224 formed along a longitudinal direction of the pattern parts 2122 and 2222. Thus, in the secondary battery manufactured by the above-described apparatus for sealing the battery case, the sealing may be performed in a state in which the unevenness may be formed in the longitudinal direction of the side 134 on the side 134, in particular, the outer surface of the sealed area 1341 of the side 134, and the unevenness is formed also on the sealant layer 1351 sealed inside the side 134. Particularly, since the grooves include the longitudinal grooves 2124 and 2224, a formed direction of the unevenness may be perpendicular to a bent direction of the side 134. Thus, since the surface area of the sealed area 1341 of the side 134 and the length of the path through which the side 134 is bent increase, the sealing force of the side 134 may increase.

The unevenness may be formed in a plurality of protruding or recessed shapes, and an interval between the protruding or recessed shapes may be formed regularly. This means that, in the apparatus for sealing the battery case, the ribs 2123 and 2223 and the grooves 2124 and 2224 have the same width, and thus, all of the unevenness formed on the outer surface of the side 134 and the unevenness of the sealant layer 1351 are formed at regular intervals to more effectively increase in length of the path along which the side 134 is bent.

In addition, the unevenness may be formed in at least one of a rectangular shape or a rhombus shape in a cross-section of the protruding or recessed shape. That is, as illustrated in FIG. 19, the sealant layer 1351 may be sealed in a state in which the unevenness formed on the outer surface of the side 134, particularly a sealed area 1341 of the side 134 has a rectangular shape, and the unevenness formed on the sealant layer 1351 sealed inside the side 134 also has a rectangular shape.

Although not shown in the drawings, in the apparatus for sealing the battery case according to a modified example of another embodiment of the present invention, two types of grooves may be formed to have an inclination in both the longitudinal direction and the width direction of the pattern parts 2121*a* and 2122*a*. Thus, the unevenness formed on the outer surface of the sealed area 1341 of the side 134 in the secondary battery manufactured by the above-described apparatus for sealing the battery case may have a rhombus shape. As a result, the path along which the side 134 is bent may be longer, and since nodes are formed for each path, the side 134 may be bent in stages to further increase in sealing force.

Figure 22:
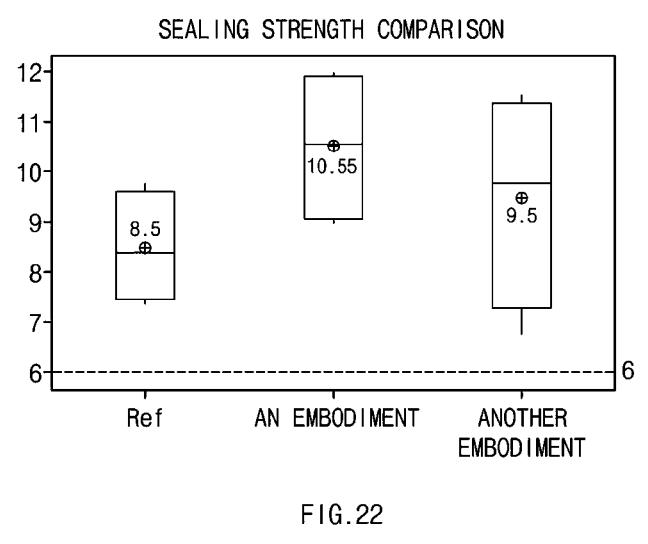

FIG. 22 is a box plot illustrating results obtained by comparing the side 134 sealed using the sealing tool according to the related art, the side 134 sealed using the sealing tools 21 and 22 according to an embodiment of the present invention, and the side 134 sealed using the sealing tools 21*a* and 22*a* according to another embodiment of the present invention with each other.

In fact, after the plurality of sides 134 are sealed using the sealing tool 31 according to the related art, the sealing tools 21 and 22 according to an embodiment of the present invention, and the sealing tools 21*a* and 22*a* according to another embodiment of the present invention, respectively, sealing strength was measured. In addition, the sealing strength was shown as a box plot as illustrated in FIG. 22.

When the sealing tool 31 according to the related art is used, an average value was 8.5 N/mm, a maximum value was 9.6 N/mm, and a minimum value was 7.5 N/mm. On the other hand, when the sealing tools 21 and 22 according to an embodiment of the present invention are used, an average value was 10.55 N/mm, a maximum value was 11.8 N/mm, and a minimum value was 9.1 N/mm. In addition, when the sealing tools 21*a* and 22*a* according to another embodiment of the present invention are used, an average value was 9.5 N/mm, a maximum value was 11.4 N/mm, and a minimum value was 7.2 N/mm.

As a result, when the sealing tools 21 and 22 according to an embodiment of the present invention are used, it is derived that the sealing strength is stronger than when the sealing tool 31 according to the related art is used. However, when the sealing tools 21*a* and 22*a* according to another embodiment of the present invention are used, the minimum value of the sealing strength is lower than when the sealing tool 31 according to the related art is used. However, the average and maximum values of the sealing strength were higher than in the case of using the sealing tool 31 according to the related art.

Therefore, it was confirmed that the sealing force was further improved according to the embodiments of the present invention.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

[Description of the Symbols]

| | |
|---|---|
| 1: Secondary battery | 10: Electrode assembly |
| 11: Electrode tab | 12: Electrode lead |

-continued

[Description of the Symbols]

| | |
|---|---|
| 13: Battery case | 14: Insulating part |
| 15: Poly-ball | 21: First sealing tool |
| 22: Second sealing tool | 23: Groove |
| 111: Positive electrode tab | 112: Negative electrode tab |
| 121: Positive electrode lead | 122: Negative electrode lead |
| 131: First case | 132: Second case |
| 133: Cup part | 134: Side |
| 135: Pouch film | 136: Bridge |
| 137: Degassing part | 212: First sealing part |
| 222: Second sealing part | 1331: Accommodation space |
| 1351: Sealant layer | 1352: Moisture barrier layer |
| 1353: Surface protective layer | 1354: Drawing assistance layer |
| 2121: First weak sealing part | 2122: First pattern part |
| 2123: First rib | 2124: First longitudinal groove |
| 2125: First width groove | 2221: Second weak sealing part |
| 2222: Second pattern part | 2223: Second rib |
| 2224: Second longitudinal groove | 2225: Second width groove |

The invention claimed is:

1. An apparatus for sealing a battery case, the apparatus comprises:

a first sealing tool configured to seal a side of a pouch-type secondary battery, wherein the first sealing tool comprises:

a body;

a first sealing part formed at one side of the body and configured to directly press the side so as to seal the side, wherein the first sealing part comprises:

a first weak sealing part configured to seal an inner portion of the side and formed to be recessed inward; and a first pattern part configured to seal an outer portion of the side and formed by regularly repeating a first rib formed to protrude outward and a first groove formed to be recessed inward, and a second sealing tool configured to be in contact with the first sealing tool with the side therebetween to press the other surface of the side, a second sealing part of the second sealing tool comprises:

a second weak sealing part configured to seal the inner portion of the side and formed to be recessed inward; and a second pattern part configured to seal the outer portion of the side and formed by regularly repeating a second rib formed to protrude outward and a second groove formed to be recessed inward, wherein, in the first pattern part and the second pattern part, the first rib and the second groove are in contact with each other with the side therebetween, and the second rib and the first groove are in contact with each other with the side therebetween.

2. The apparatus of claim 1, wherein the first groove comprises a longitudinal groove formed in a longitudinal direction of the first pattern part.

3. The apparatus of claim 2, wherein the first groove comprises a width formed in a width direction of the first pattern part.

4. The apparatus of claim 1, wherein the first groove of the first pattern part is recessed deeper than the first weak sealing part.

5. The apparatus of claim 4, wherein the first weak sealing part is recessed inward by a thickness of 10 μm to 20 μm.

6. The apparatus of claim 4, wherein, in the first pattern part, the first groove is recessed inward by a thickness of 40 μm to 60 μm.

7. The apparatus of claim 1, wherein the first rib and the first groove have a same width.

8. The apparatus of claim 1, wherein the first weak sealing part has a rounded edge.

9. The apparatus of claim 8, wherein, in the first weak sealing part, the edge (R1) is rounded at a curvature radius of 0.7 mm to 0.8 mm.

10. The apparatus of claim 1, wherein the first pattern part has a rounded edge.

11. The apparatus of claim 10, wherein, in the first pattern part, the edge (R3) is rounded at a curvature radius of 0.2 mm to 0.3 mm.

12. The apparatus of claim 1, wherein, the first sealing part comprises a second groove formed to be recessed inwardly, wherein an electrode lead of the secondary battery is configured to be inserted into the second groove.

13. A secondary battery manufactured by using the apparatus for sealing the battery case of claim 1, the secondary battery comprising:

an electrode assembly formed by alternately stacking electrodes and separators; and a battery case in which the electrode assembly is accommodated and sealed, wherein the battery case comprises:

a first case in which a cup part that is a space, in which the electrode assembly is accommodated, is formed;

a second case configured to cover the first case from above; and a side extending to an outside of the cup part to have an area on which the first case and the second case are sealed to each other, wherein the side has an unevenness in a shape protruding from or recessed into an outer surface of the sealed area of the side.

14. The secondary battery of claim 13, wherein the side has an unevenness having a shape protruding from or recessed into an inner surface of the sealed area, and wherein the unevenness formed on the inner surface has the protruding or recessed shape opposite to that of the unevenness formed on the outer surface.

15. The secondary battery of claim 13, wherein the unevenness has a length in a longitudinal direction of the side.

16. The secondary battery of claim 13, wherein the unevenness has a plurality of protruding or recessed shapes, and wherein the plurality of protruding or recessed shapes are formed at regular intervals.

17. The secondary battery of claim 13, wherein the unevenness is formed in at least one of a rectangular shape or a rhombus shape in a cross-section of the protruding or recessed shape.

* * * * *